(12) United States Patent
Alexandre et al.

(10) Patent No.: US 9,186,718 B2
(45) Date of Patent: *Nov. 17, 2015

(54) CYCLE WHEEL RIM AND METHOD OF MANUFACTURE

(71) Applicant: MAVIC S.A.S., Metz-Tessy (FR)

(72) Inventors: Bérenger Alexandre, Pringy (FR); Jean-Pierre Mercat, Chavanod (FR)

(73) Assignee: MAVIC S.A.S., Metz-Tessy (FR)

( * ) Notice: Subject to any disclaimer, the term of this patent is extended or adjusted under 35 U.S.C. 154(b) by 265 days.

This patent is subject to a terminal disclaimer.

(21) Appl. No.: 13/733,342

(22) Filed: Jan. 3, 2013

(65) Prior Publication Data

US 2013/0167379 A1    Jul. 4, 2013

(30) Foreign Application Priority Data

Jan. 4, 2012    (FR) ...................................... 12 00028

(51) Int. Cl.
B21D 53/30    (2006.01)
B60B 21/06    (2006.01)
(Continued)

(52) U.S. Cl.
CPC .............. *B21D 53/30* (2013.01); *B60B 21/025* (2013.01); *B60B 21/026* (2013.01); *B60B 21/062* (2013.01); *B60B 21/08* (2013.01); *B23C 5/14* (2013.01); *B60B 1/003* (2013.01); *B60B 2310/211* (2013.01); *B60B 2310/232* (2013.01); *B60B 2310/234* (2013.01); *B60B 2360/104* (2013.01); *B60B 2360/1458* (2013.01);
(Continued)

(58) Field of Classification Search
CPC ............ B21D 53/30; B23C 3/02; B23C 3/16; B23C 5/14; B23P 13/00; B23P 15/00; B60B 1/003; B60B 21/025; B60B 21/062; B60B 21/08; B60B 2310/228; B60B 2310/232; B60B 2310/234; B60B 2900/111; B60B 2900/311; Y10T 29/49524; Y10T 29/49526
See application file for complete search history.

(56) References Cited

U.S. PATENT DOCUMENTS 5,651,591 A * 7/1997 Mercat et al. ............ 301/95.108
5,871,314 A * 2/1999 Trionfetti ...................... 409/165
(Continued)

FOREIGN PATENT DOCUMENTS

EP      0 579 525 A1    1/1994
EP      1 084 868 A1    3/2001
(Continued)

OTHER PUBLICATIONS

U.S. Appl. No. 13/733,345 (Bérenger Alexandre), filed on Jan. 3, 2013.
(Continued)

*Primary Examiner* — Alexander P Taousakis
*Assistant Examiner* — Matthew P Travers
(74) *Attorney, Agent, or Firm* — Greenblum & Bernstein, P.L.C.

(57) ABSTRACT

A method for manufacturing a cycle wheel rim having, in radial cross section, two lateral sidewalls and a bridge, the rim having an outer surface facing outward of the rim and defined by the bridge and by at least a portion of the sidewalls. The manufacturing method includes extruding a section; bending the section; assembling the ends of the hoop formed from the section by joining one to the another; drilling holes in the bridge for fastening the spokes; machining the entire outer surface in a radial plane and on at least a portion of the circumference of the rim.

19 Claims, 12 Drawing Sheets

(51) Int. Cl.
 *B60B 21/08* (2006.01)
 *B60B 21/02* (2006.01)
 *B23C 5/14* (2006.01)
 *B60B 1/00* (2006.01)
(52) U.S. Cl.
 CPC ..... *B60B2900/111* (2013.01); *B60B 2900/311* (2013.01); *B60B 2900/321* (2013.01); *B60Y 2200/13* (2013.01); *B60Y 2200/134* (2013.01); *Y10T 29/49526* (2015.01)

(56) References Cited

U.S. PATENT DOCUMENTS

| | | |
|---|---|---|
| 6,402,256 B1 | 6/2002 | Mercat |
| 6,961,999 B2 | 11/2005 | Shook |
| 2005/0017569 A1 | 1/2005 | Passarotto |
| 2005/0242658 A1 | 11/2005 | Carlson et al. |
| 2006/0043784 A1 | 3/2006 | Passarotto et al. |
| 2008/0054712 A1 | 3/2008 | Urbani |

FOREIGN PATENT DOCUMENTS

| | | |
|---|---|---|
| EP | 1 428 685 A2 | 6/2004 |
| EP | 1 491 362 A1 | 12/2004 |
| EP | 1 629 997 A1 | 3/2006 |
| EP | 1 894 744 A1 | 3/2008 |
| FR | 2 727 355 A1 | 5/1996 |
| WO | WO-2005/108120 A2 | 11/2005 |

OTHER PUBLICATIONS

U.S. Appl. No. 13/733,348 (Bérenger Alexandre), filed on Jan. 3, 2013.

* cited by examiner

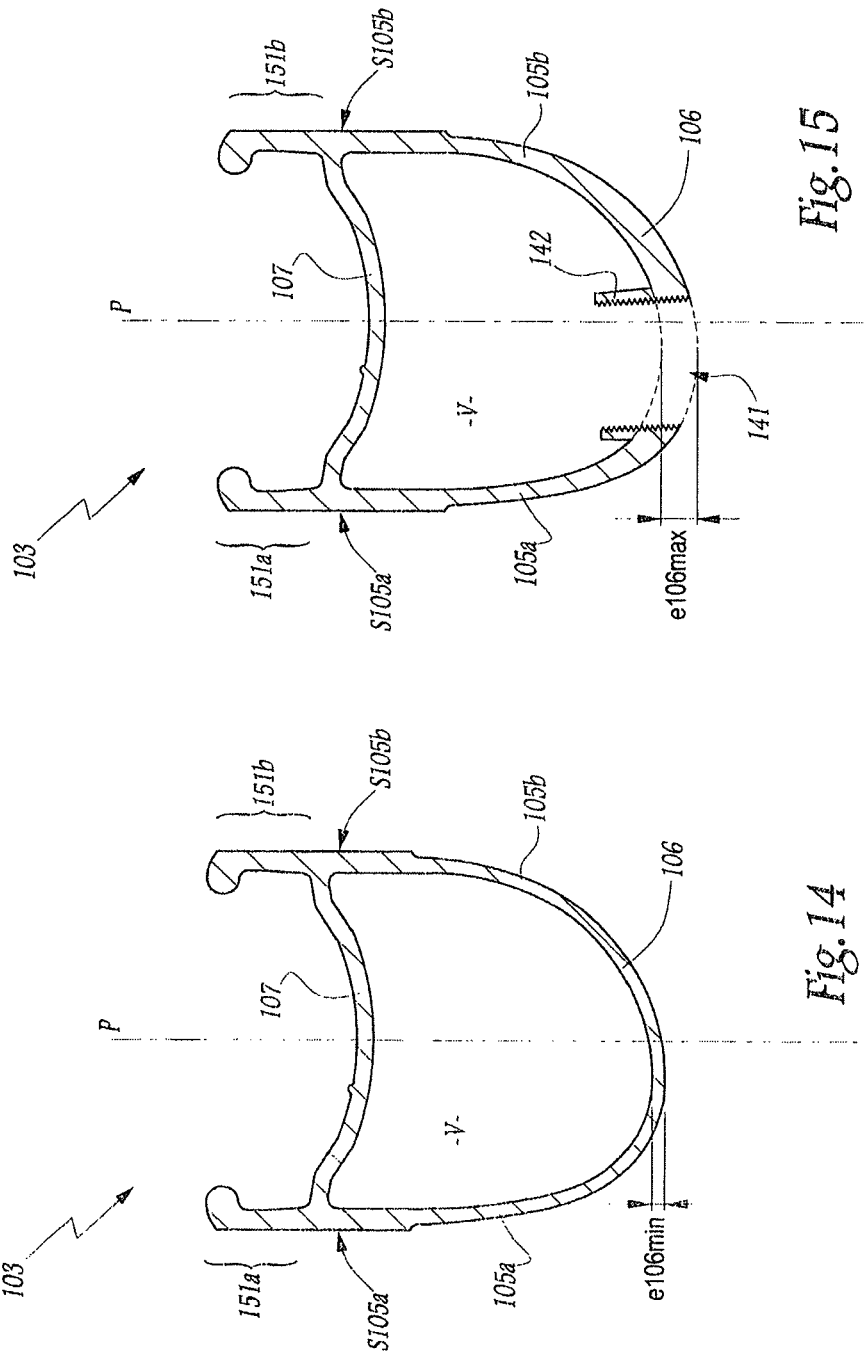

CYCLE WHEEL RIM AND METHOD OF MANUFACTURE

CROSS-REFERENCE TO RELATED APPLICATION

This application is based upon French Patent Application No. 12/00028, filed Jan. 4, 2012, the disclosure of which is hereby incorporated by reference thereto in its entirety, and the priority of which is claimed under 35 U.S.C. §119.

BACKGROUND

1. Field of the Invention

The invention relates to a rim for a cycle wheel, and a method for manufacturing such a rim.

2. Background Information

Conventionally, a cycle wheel rim is annular and has a U-shaped radial cross section, with two lateral sidewalls that are generally perpendicular to the axis of rotation of the wheel and a bridge that connects the lateral sidewalls and is oriented so as to be opposite the axis of rotation of the wheel. In the case of a spoked wheel, the spokes are generally fastened to the bridge of the rim.

To manufacture a cycle wheel rim, it is known to make a rectilinear section by extruding or spinning a metal alloy, such as an aluminum alloy, for example, and then bending the section into an annular shape. The ends of the rim are then connected to one another, for example by welding.

It is advantageous to produce a lightweight rim, in order to optimize the performance of the cyclist, while maintaining sufficient rigidity and strength to avoid breakage.

The extrusion process requires minimum wall thicknesses, for the yield stress increases significantly when the thickness decreases and the characteristics of the alloy and the spinning speed increase. Thus, for alloys that are typically used in the manufacture of rims, it is very risky to go below thicknesses of 0.85 mm, as doing so may quickly break the extrusion die.

In addition, the bending of a section causes significant plastic deformations, particularly in the zones that are away from the center of gravity of the cross section. These substantial plastic deformations cause dislocations of the grains of the material which, in turn, can result in a surface finish known as "orange peel," which is often considered unsightly.

Furthermore, overly thin lateral walls also generate local buckling of the walls of the section during bending, when subject to overly high compressive deformations.

To overcome the aforementioned drawbacks, the document FR-A-2 727 355 proposes to make a rim by extruding a rectilinear section having sufficient thickness to prevent the extrusion from causing defects in the material. The section is then bent, and it does not change and does not buckle due to its thickness. To reduce the weight of the rim, the rim is then immersed in an aggressive chemical bath which attacks the material and decreases its thickness. This manufacturing method is relatively cumbersome to implement and, although the surface finish does become uniform, it remains quite rough.

Similarly, the document U.S. Pat. No. 6,961,999 proposes extruding and bending a sufficiently thick section in order not to cause manufacturing defects. The lateral sidewalls of the rim are then machined to reduce their thickness and to decrease the weight of the rim. The document EP-A-0 579 525 also proposes machining the lateral sidewalls of the rim after extrusion and bending of the section. Reducing the weight of the rim is not optimal because the bridge of the rim retains its initial thickness.

It is also known, from the documents EP-A-1 084 868 and EP-A-1 491 362, to machine the section after bending, both in the area of the bridge and in the area of the lateral sidewalls of the rim, and only on certain portions of the circumference of the rim. The machining is time-intensive and it is complex to implement, because it requires the use of a five-axis machine. When it is desired to produce a plurality of rims having various geometries, for example with respect to the number of spokes, the location of the spoke fastening zones, or the thickness of the rim, all of these methods require a modification of the manufacturing parameters, in particular with respect to the machining for material removal and/or chemical milling. This leads to additional development costs and does not standardize the manufacturing method.

SUMMARY

The foregoing are drawbacks that the present invention overcomes, particularly by providing a cycle wheel rim and a method for manufacturing such a rim, which makes it possible to reduce the weight of the rim while optimizing rigidity. In addition, the rim according to the invention can be manufactured quickly, and the manufacturing method prevents the occurrence of defects during the extrusion and bending of the section.

The useful life of rims is often limited by the appearance of cracks in the spoke fastening zone. Once they occur, such cracks propagate very quickly in the spinning direction, quickly causing a rupture of the bridge. This well-known fatigue phenomenon is due to the numerous load cycles to which the spokes are subjected at each turn of the wheel, on the one hand, and it is also accelerated by small surface defects which typically are longitudinal striations caused by friction of the metal in the die during the spinning operation, on the other hand. The invention therefore also optimizes the fatigue strength of the rim by locally reinforcing the fastening of the spoke, but also by improving the surface finish in order to eliminate or delay the initiation of fatigue cracks.

To these ends, the invention includes a method for manufacturing a rim for a cycle wheel, the rim having a U-shaped radial cross section, with two lateral sidewalls and a bridge connecting the sidewalls and located so as to be opposite an axis of rotation of the wheel, the rim having an associated outer surface which is positioned outward of the rim and defined by the bridge and by at least a portion of the sidewalls. The manufacturing method comprising:

extruding a rectilinear section, such section comprising two lateral sidewalls and a bridge connecting the sidewalls and located so as to be opposite an axis of rotation of the wheel, the section having an associated outer surface which faces outwardly of the rim and is defined by the bridge and by at least a portion of the sidewalls;

bending the section to form a hoop, or ring;

assembling the ends of the hoop formed from the section by affixing each to the other;

drilling holes in the bridge for fastening the spokes of the wheel;

after the aforementioned drilling, machining at least one median zone of the outer surface of the bridge, which has a transverse width, measured perpendicular to the median plane, greater than 4 mm, over at least 95% of the circumference of the rim.

As an aspect of the invention, the machining is used to trim the edges of the spoke fastening holes, to improve the surface finish in the vicinity of the fastening holes, and between the fastening holes, and to reduce the risks of causing fatigue cracks.

In a particular embodiment of the invention, the entire outer surface of the bridge is machined over the entire circumference.

In a particular embodiment of the invention, the entire outer surface of the rim is machined in a radial plane, over at least a portion of the circumference.

In the various embodiments described below, the machining is done over the entire circumference of the rim. In other embodiments not described in detail, which are also encompassed by the invention, the machining is carried out on almost the entire circumference. In such a case, at least 95%, or even 97%, of the circumference is machined. This configuration may be selected if it is desired, for example, to produce an unbalance to counterbalance the weight of the splice bar of a sleeved rim and/or of the inflation valve. In a particular embodiment, even in the case in which only 95% of the circumference of the rim is machined, it is necessary to ensure that all of the spoke fastening zones are machined.

As an aspect of the invention, the lateral sidewalls and the bridge of the rim are machined simultaneously. Thus, the manufacture is easier and faster, and the weight of the rim is reduced. In addition, the machining improves the surface finish of the bridge and of the sidewalls by eliminating the defects resulting from spinning or bending the section, thereby improving the fatigue strength. Moreover, the aerodynamics of the rim are optimized as the simultaneous machining of the bridge and the sidewalls makes it possible to avoid the formation of ridges between the bridge and the sidewalls.

This manufacturing method is standardized, that is to say, it is possible to easily manufacture rims of various geometries from the same section, without the need to change the tools provided for the extrusion, bending, and machining. For example, for the manufacture of a line of rims, it is possible to make various front and rear wheel rims from the same section and to use the same machining tools.

In the field of rim manufacture, fatigue cracks generally occur in the area of the bridge of the rim, around spoke fastening zones. If a rim made by such a method proves to be insufficiently strong, the thickness of the bridge of the rim can easily be increased, at least in the area of certain zones of the circumference of the rim, by keeping the initial tools and by varying the geometric parameters of the machining. For example, if the rim is machined with a milling cutter having a concave profile, it suffices to shift the milling cutter toward the axis of rotation of the rim to increase the thickness of its walls. Thus, rim development costs are reduced.

According to advantageous but not essential aspects of the invention, such a manufacturing method may incorporate one or more of the following characteristics, taken in any technically permissible combination:

The machining is carried out using a milling cutter having a concave profile and enabling the bridge and at least a portion of the sidewalls to be machined simultaneously in a radial plane.

The outer surface of the rim comprises the entire outer surface of the sidewalls.

The rim is divided into a plurality of zones which divide the circumference of the rim into angular sectors, the zones including:
   transmission zones located around the zones of attachment of the spokes of the wheel; and
   intermediate zones located between the transmission zones.

In the area of the transmission zones, the thickness of the bridge, measured in a median plane of the rim, is equal to a maximum thickness. In the area of the intermediate zones, the thickness of the bridge, measured in a median plane of the rim at the end of the machining, is equal to a minimum thickness that is less than the maximum thickness. During the machining, the outer surface of the rim is machined, at least in the area of the intermediate zones.

The zones further include transition zones each located between a transmission zone and an intermediate zone. In the area of the transition zones, the thickness of the bridge is equal to an intermediate thickness, which varies progressively between the minimum thickness and maximum thickness of the bridge. During the machining, the outer surface of the rim is machined at least in the area of the transition zones.

During the machining, the entire outer surface of the rim is machined over the entire circumference of the rim.

The outer surface comprises all of the sidewalls and, in the machining, the entire outer surface of the rim is machined in a radial plane, on at least a portion of the circumference of the rim.

At the end of the extruding, a radius of curvature of the bridge of the section, measured in the radial plane of the rim, is greater than 20 mm. At the end of machining, a radius of curvature of the bridge of the rim is less than 15 mm or, in a particular embodiment, less than 10 mm.

At the end of extruding, a thickness of the bridge of the section is greater than 1.6 mm or, in a particular embodiment, greater than 1.9 mm.

A ratio, whose denominator is a thickness of the bridge of the section, measured at the end of the extruding, and whose numerator is a thickness of the bridge of the rim, measured at the end of the machining, is less than 90%.

During the drilling, holes and chimneys (or bushings) for fastening the spokes are made simultaneously by flow-drilling the bridge, without cutting.

A minimum machining thickness, equal to the difference between the thickness of the bridge of the section, measured at the end of the extruding, and the minimum thickness of the bridge of the rim, measured at the end of the machining and considered over the entire circumference of the rim, is greater than 0.1 mm or, in a particular embodiment, greater than 0.3 mm.

During drilling, holes and bushings for fastening the spokes are made simultaneously by flow-drilling the bridge, without cutting.

The invention also relates to a cycle wheel rim made using the aforementioned method.

According to advantageous but not essential aspects of the invention, a manufacturing method of the aforementioned type may incorporate one or more of the following characteristics, taken in any technically permissible combination:

The maximum thickness of the bridge is greater than 1.6 mm or, in a particular embodiment, greater than 2.0 mm.

The minimum thickness of the bridge is less than 0.65 mm or, in a particular embodiment, less than 0.8 mm.

In a radial cross section of the rim, a radius of curvature of the bridge is less than 15 mm or, in a particular embodiment, less than 10 mm.

The bridge comprises internally threaded cylindrical chimneys, or bushings, for fastening the spokes of the wheel, and the chimneys/bushings are made unitary with the rim.

The sidewalls each define a planar, or flat, braking surface, adapted to cooperate with a brake pad. A height of at least one braking surface, measured in the radial plane, is greater in the area of the transmission zones than in the area of the intermediate zones.

BRIEF DESCRIPTION OF DRAWINGS

The invention will be better understood upon reading the following description of a cycle wheel rim and of a method for manufacturing such a rim in accordance with its principle, given solely by way of example and in reference to the annexed drawings, in which:

FIGS. 12-15 are cross sections along the lines XII-XII, XIII-XIII, XIV-XIV, and XV-XV of FIG. 11, the spokes being omitted in FIGS. 12, 13, and 15 for clarity of the drawings;

DETAILED DESCRIPTION

Figure 1:
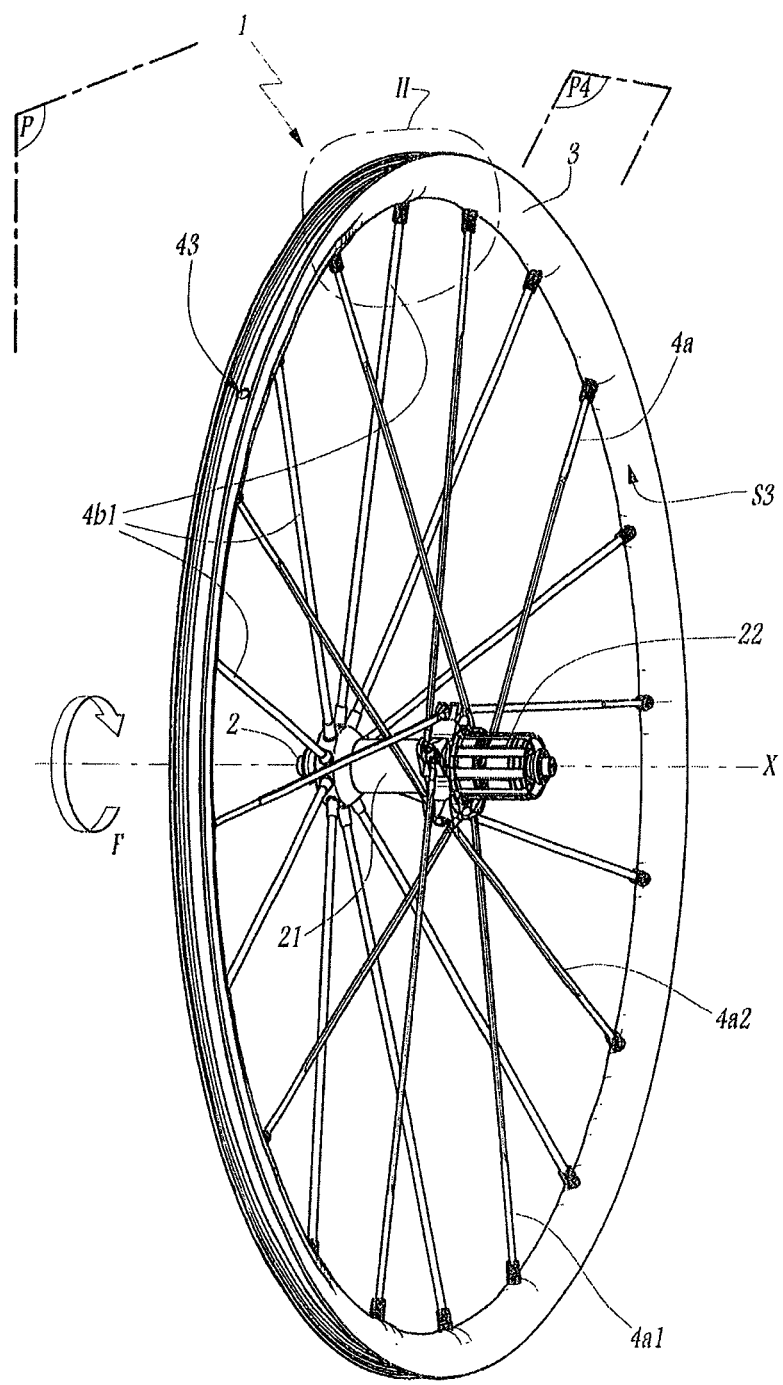
FIG. 1 is a perspective view of a cycle wheel shown without the tire and including a rim according to the invention.

FIG. 1 shows a bicycle rear wheel 1, without a tire mounted thereon. The wheel 1 comprises two sets 4a, 4b of spokes 4a1, 4a2, 4b1 mounted on a rim 3. The spoke sets 4a, 4b are connected to a hub 2 of the wheel 1, which comprises a hub body 21 extending along an axis of rotation X of the wheel 1. A freewheel mechanism 22 is connected to one end of the hub body 21 which supports the spoke set 4a, and the other end of the hub body 21 supports the spoke set 4b. The freewheel mechanism 22 is provided to be assembled with a sprocket cassette (not shown).

When a cyclist pedals in the forward direction, the cyclist rotates the wheel 1 about the axis of rotation X through the sprocket cassette and the freewheel mechanism 22 in a direction designated by the arrow F in FIG. 1.

The spoke set 4a comprises driving spokes 4a2, which pull on the rim 3 when the cyclist pedals, and non-driving spokes 4a1, or pushing spokes, which tend to relax when the cyclist pedals. The spoke set 4a is the driving set; its spokes 4a1 and 4a2 are fastened on the side of the hub body 21 which carries the freewheel mechanism 22 and receives the torque resulting from the pedaling force from the cyclist. Conversely, the spoke set 4b is the driven set.

Figure 3:
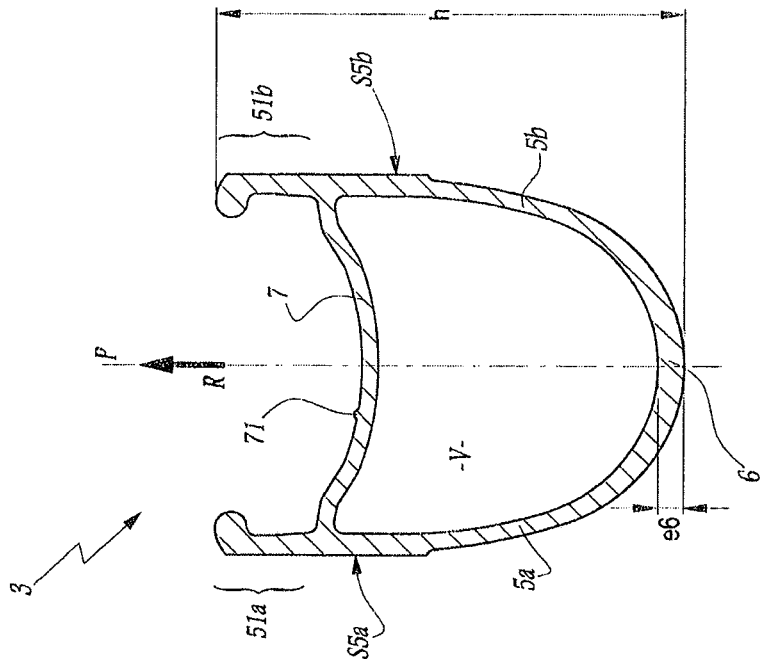
FIGS. 3, 4, and 5 are radial cross sections along the lines III-III, IV-IV, and V-V of FIG. 2, the spokes being omitted in FIG. 5 for clarity of the drawing.
Figure 4:
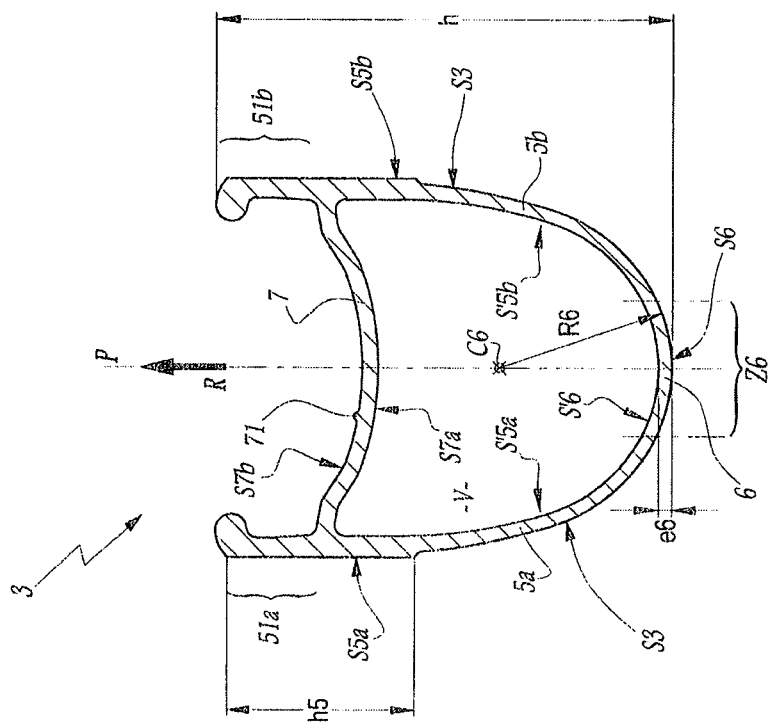
Figure 5:
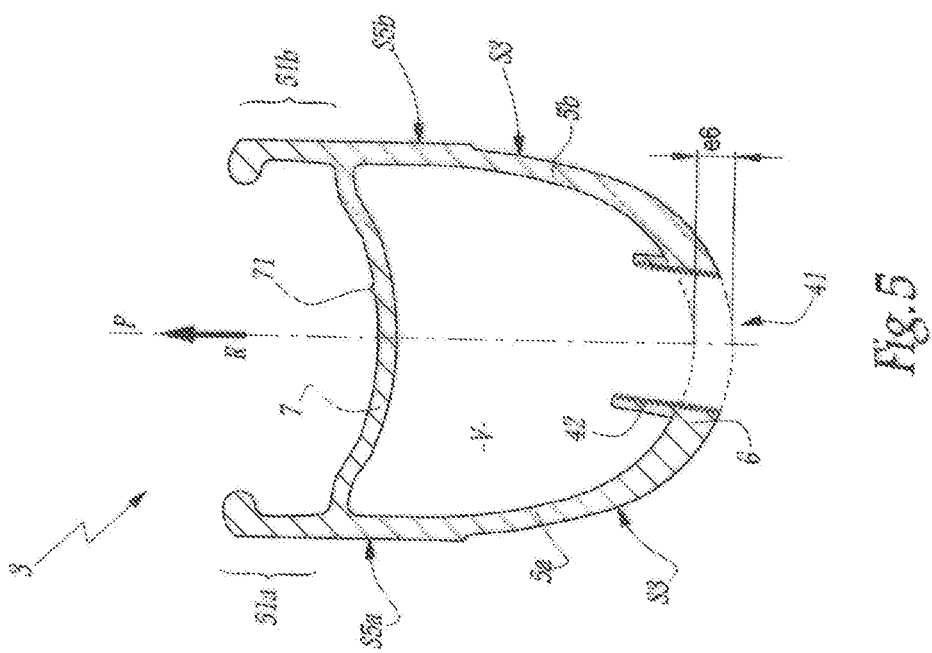

As shown in FIGS. 3 to 5, the radial cross section of the rim 3, considered in a radial plane P4 of the rim 3 passing through the axis X and extending along a radial direction of the rim 3, is in the form of a hollow box, or having a U-shape, with a transverse wall 7, or bridge, connecting the two vertical arms of the "U". The expression "radial cross section" refers herein to a cross section in a plane P4 passing through the axis X, oriented along a radial direction. The rim 3 comprises two lateral sidewalls 5a and 5b, or sidewalls, and a curved, or arcuate, bridge 6 connecting the sidewalls 5a and 5b to one another and forming the curved portion of the U-shaped cross section. The bridge 6 is located on the side of the axis of rotation X, or faces the axis of rotation, and the transverse wall 7 is located on the side of the tire, or faces the tire. Although the transverse wall 7 could be referred to as a bridge or upper bridge (and bridge 6, a lower bridge), the wall 7 is referred to herein as a transverse wall. The rim 3 thus demarcates an inner volume V. The convex side of the bridge 6 is oriented so as to be opposite the axis X, and the concave side of the bridge 6 is oriented toward the tire. The transverse wall 7 is generally perpendicular to the sidewalls 5a and 5b and connects the sidewalls 5a and 5b to one another, opposite the bridge 6. On the side opposite the bridge 6, the sidewalls 5a and 5b are each provided with an L-shaped flange 51a and 51b, provided for fastening a tire, not shown, to the rim 3. The flanges 51a and 51b project outward of the box formed by the rim 3. The box shape of the rim 3 is demarcated by the sidewalls 5a and 5b, the bridge 6, and the transverse wall 7.

Figure 7:
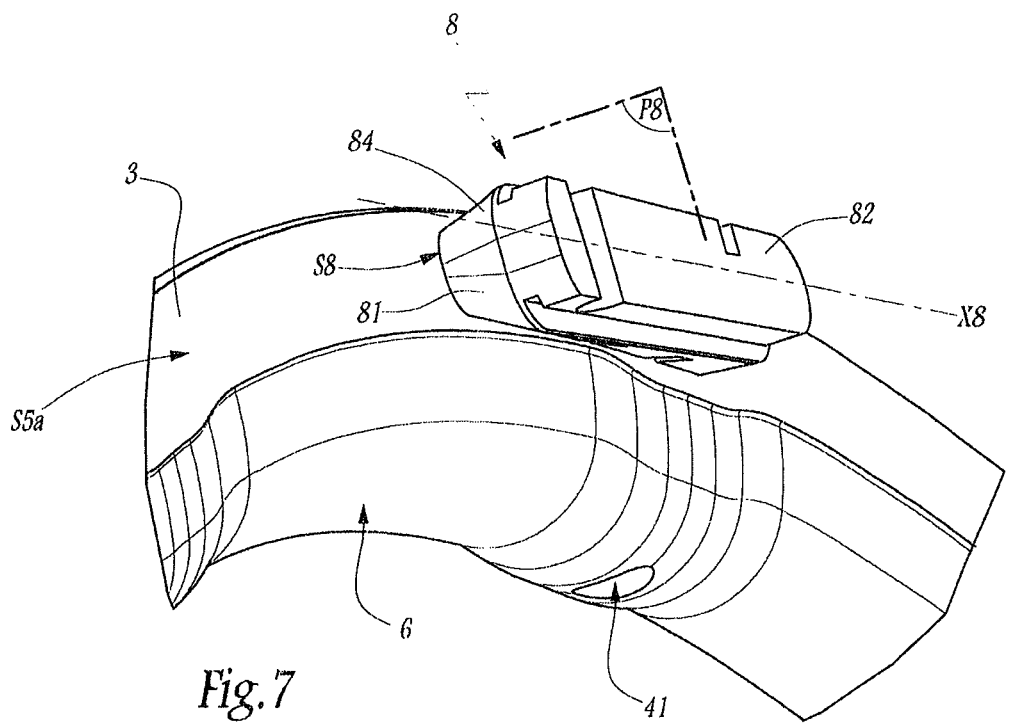
FIG. 7 is a perspective view of an unworn rim brake element, used to brake the wheel of FIG. 1 and shown bearing against the rim, which is partially shown.
Figure 8:
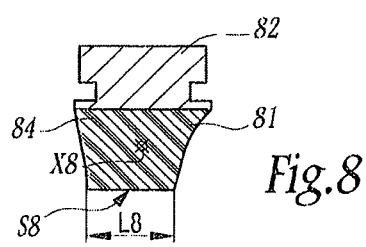
FIG. 8 is a cross section along the plane P8 of FIG. 7.

The rim 3 is provided to be used with a rim brake system comprising two braking elements 8, one of which is shown in FIG. 7; such braking elements 8 are mounted on a stirrup attached to the frame of the cycle. Each braking element 8 comprises a pad 81 mounted on a support element 82 and extends longitudinally along an axis X8 which, during use, is locally tangent to a circumferential direction of the rim 3. In other words, during use, the axis X8 extends along an ortho-radial direction of the rim 3. Each pad has a decreasing width L8, between the portion 84 fixed to the support 82 and the friction surface S8 in the form of a ring section, which comes into contact with braking surfaces S5a and S5b of the rim 3 during braking. The width L8 is measured perpendicular to the axis X8 and parallel to the surface S8.

The braking surfaces S5a and S5b are defined outside of the volume V by the flanges 51a and 51b and a portion of the sidewalls 5a and 5b adjoining the flanges 51a and 51b. The surfaces S5a and S5b are flat and perpendicular to the axis X.

Notable is a median plane P of the wheel 1, perpendicular to the axis X. The median plane P passes between the sidewalls 5a and 5b and between the flanges 51a and 51b, at equal distances therefrom. Thus, the sidewalls 5a and 5b are located on opposite sides of the median plane P.

Also notable is the height h5 of the braking surfaces S5a and S5b, measured parallel to the plane P, along a radial direction R of the wheel 1. See FIG. 3.

The peripheral ends of the spokes 4a1, 4a2, 4b1 are equipped with threaded heads 40 attached to the bridge 6 of the rim 3. The bridge 6 comprises holes 41, the edges of which are extended inward of the inner volume V by a generally cylindrical bushing 42. The bushings 42 are internally threaded for threaded engagement with the heads 40.

A valve hole 43 (see FIG. 1) is made through the bridge 6 and the transverse wall 7. When a tire is mounted on the rim 3, the tire valve is inserted into the valve hole 43 and projects outward from the rim 3.

The transverse wall 7 is provided with a locating member 71, such as a ridge, that is offset relative to the plane P. The locating member 71 makes it possible to identify the right side and the left side of the rim 3, to facilitate the mounting of the spokes 4a1, 4a2, 4b1.

The bridge 6 has a thickness e6 measured along the radial direction R, in the plane P and perpendicular to the axis X.

The rim 3 is divided into a plurality of zones Z1, Z2, Z3a1, Z3a2, Z3b1, which divide the circumference of the rim 3 into a plurality of angular sectors. The transmission zones Z3a1, Z3a2, Z3b1 are located around holes 41 where the spokes 4a1, 4a2, 4b1 are mounted. Two transition zones Z2 are located on both sides of each transmission zone Z3a1, Z3a2, Z3b1. The intermediate zones Z1 are located between the transition zones Z2 and are farther away from the holes 41 than the zones Z2, Z3a1, Z3a2, Z3b1. Thus, each transition zone Z2 is located between a transmission zone Z3a1, Z3a2, Z3b1 and an intermediate zone Z1.

During use, the transmission zones Z3a1, Z3a2, Z3b1 are subject to mechanical stresses of relatively high intensity because it is in this area that the force produced by the cyclist is transmitted to the rim 3. The transition zones Z2 are subject to mechanical stresses of average intensity because they are adjacent the transmission zones Z3a1, Z3a2, Z3b1. The intermediate zones Z1 are subject to relatively low mechanical stresses because they are away from the transmission zones Z3a1, Z3a2, Z3b1.

The greater the thickness e6 of the bridge 6, the stronger and heavier the rim 3 will be. Conversely, the smaller the thickness e6 of the bridge 6, the weaker and lighter the rim 3 will be. To obtain a rim 3 with satisfactory mechanical strength and reduced weight, the thickness e6 is adapted as a function of the mechanical stresses withstood by the various zones Z1, Z2, Z3a1, Z3a2, Z3b1.

In the area of the intermediate zones Z1, the thickness e6 is equal to a minimum thickness e6min. The thickness e6min is less than 0.8 mm or, in a particular embodiment, less than 0.65 mm.

In the area of the transmission zones Z3a1, Z3a2, Z3b1, the thickness e6 is equal to a maximum thickness e6max, greater than the minimum thickness e6min. The thickness e6max is greater than 1.6 mm or, in a particular embodiment, greater than 2.0 mm.

Moreover, the intensity of the mechanical forces transmitted to the rim 3 by the spokes 4a1, 4a2, 4b1 is not the same, depending upon whether the spoke 4a1, 4a2, or 4b1 is part of a driving or driven set 4a or 4b, and whether the spoke is a driving spoke 4a2 or a non-driving spoke 4a1. In addition, the intensity of the forces transmitted is not the same for the wheel 1, which is the drive wheel of the cycle, and for the front wheel of the cycle, not shown.

Thus, the thickness e6max is not the same for each transmission zone Z3a1, Z3a2, Z3b1. The thickness e6max of the transmission zones Z3a1, in which the driving spokes 4a2 are fastened, is greater than the thickness e6max of the transmission zones Z3a2, in which the non-driving spokes 4a1 are fastened. The thickness e6max of the transmission zones Z3b1, in which the driving spoke set 4a is fastened, is greater than the thickness e6max of the transmission zones Z3a2, in which the driven spoke set 4b is attached. The thickness e6 of the drive wheel 1 of the cycle, in a particular embodiment, is greater than or equal to the thickness e6 of the front wheel of the cycle.

Optionally, the sidewalls 5a and 5b can be locally thicker in the area of the transmission zones Z3a1, Z3a2, Z3b1 and in the area of the connecting zones Z2 than in the area of the intermediate zones Z1, in order to reduce the risks of rupture for the rim 3.

In the area of the transition zones Z2, the thickness e6 is equal to an intermediate thickness e6int between the minimum thickness e6min and the maximum thickness e6max. For each transition zone Z2, the intermediate thickness e6int, in a particular embodiment, varies progressively along the circumference of the rim 3, between the intermediate zone Z1 and the respective transmission zone Z3a1, Z3a2, Z3b1 adjacent the transition zone Z2.

Notable is an outer surface S3 of the rim 3, located outside of the inner volume V and defined by the bridge 6 and by the portions of the sidewalls 5a and 5b located between the bridge 6 and the braking surfaces S5a and S5b. In the illustrated embodiment, the outer surface S3 is associated, i.e., in one piece, therewith. In the radial plane P4 of the rim 3, noted is the radius of curvature R6 of an outer surface S6 of the bridge 6, which is oriented so as to be opposite the axis of rotation X and is outside of the volume V. The outer surface S6 has a center of curvature C6. The bridge 6 is not exactly in the form of an arc of a circle. Therefore, the radius of curvature R6 is variable. The radius of curvature R6 is measured on a median zone Z6 of the bridge 6, which has a transverse width measured perpendicular to the plane P and equal to 10 mm.

In the median zone Z6, the radius of curvature R6 is less than 15 mm or, in a particular embodiment, less than 10 mm. For example, the radius R6 is equal to 8.0 mm. A large radius of curvature R6 would degrade the aerodynamics of the rim 3. The small radius of curvature R6 provides the rim 3 with optimized aerodynamics.

Figure 2:
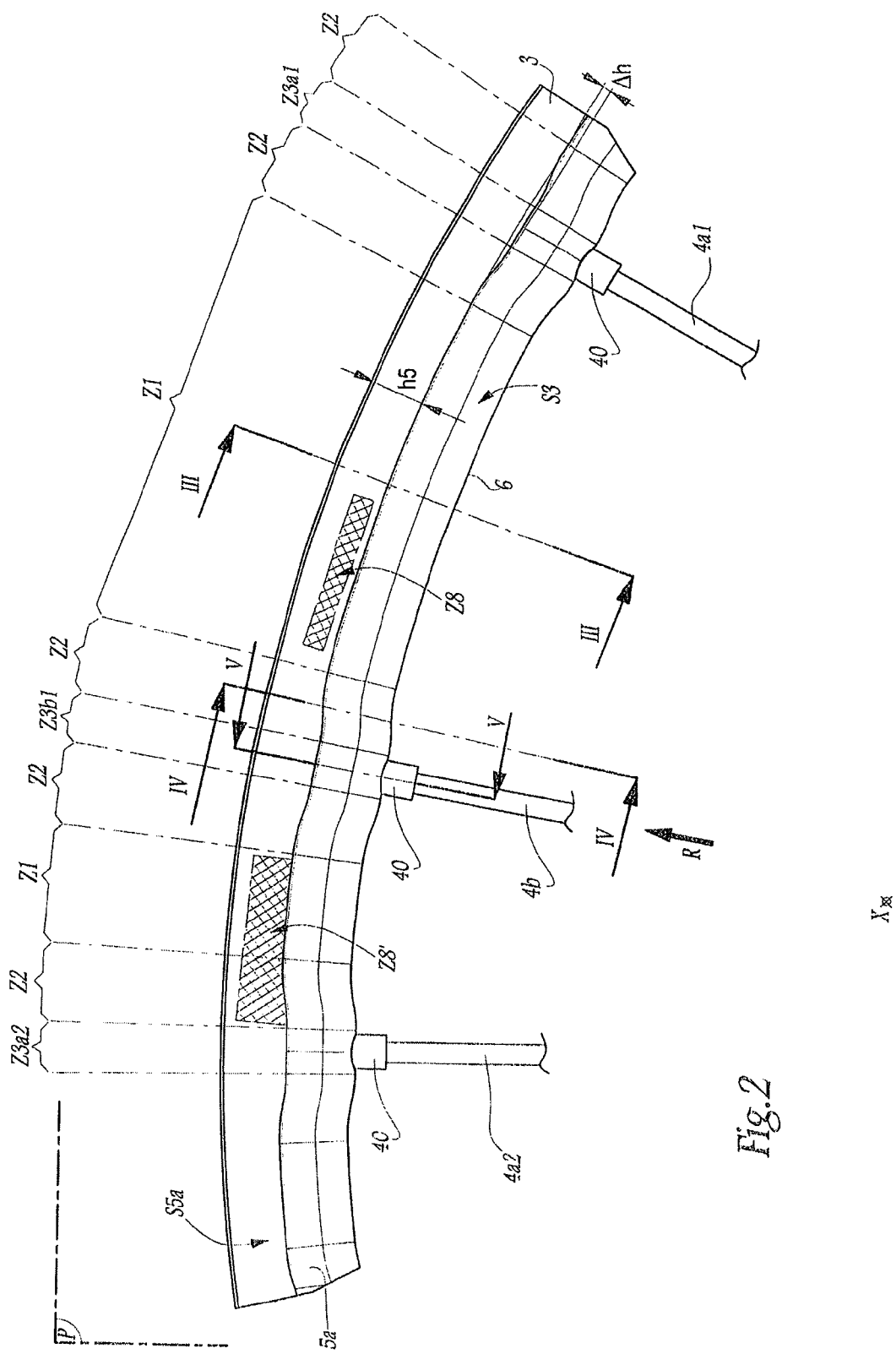
FIG. 2 is a side view of the detail II of FIG. 1.

As shown in FIG. 2, the height h5 of the braking surfaces S5a, S5b is greater in the area of the transmission zones Z3a1, Z3a2, Z3b1 than in the area of the intermediate zones Z1. As explained below, this constitutes an audible indicator of worn-out pads 81.

The rectangular zone Z8 of the rim 3, shown in FIG. 2, represents the zone of contact between the surface S8 of the pad 81 and the rim 3 during braking, when the pad 81 is not worn out, or is slightly worn out. This configuration is shown in FIG. 7. Over the entire circumference of the rim 3, the contact between the pad 81 and the rim 3 occurs only in the area of the a respective braking surface S5a, S5b, and the friction surface S8 of the pad 81 does not cover the outer surface S3 of the rim 3, which is set back toward the median plane P with respect to each respective braking surface S5a, S5b.

Figure 9:
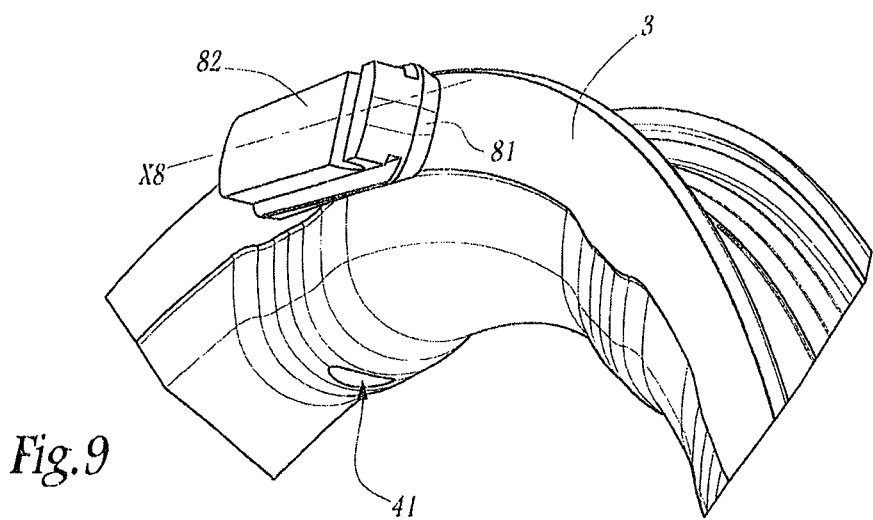
FIG. 9 is a view, similar to FIG. 7, of a worn out rim brake element.

The zone Z8' of the rim 3 represents the contact zone between the friction surface S8 of the pad 81 and the rim 3 during braking, when the pad 81 is worn out. This configuration is shown in FIG. 9. Due to the flared shape of the pad 81, the surface of the zone Z8' is larger than the surface of the zone Z8. When a pad 81 is worn out and in contact with the rim 3 above the outer surface S3, in the area of the intermediate zones Z1, a portion of the friction surface S8 of the pad 81 overlaps in the area of the braking surfaces S5a, S5b. In the area of the transmission zones Z3a1, Z3a2, Z3b1, the contact between the pad 81 and the rim 3 occurs entirely, or almost entirely, on the braking surfaces S5a, S5b. Thus, when the pad 81 is worn out, due to the height difference Δh between the intermediate zones Z1 and the transmission zones, Z3a1, Z3a2, Z3b1, the portion of the friction surface S8 of the pads 81 which, during braking, is in contact with the rim 3 in the area of the transmission zones Z3a1, Z3a2, Z3b1, is larger than in the area of the intermediate zones Z1.

During braking, the wheel 1 turns and the pad 81 rubs on the braking surfaces S5a, S5b. When the pad 81 is not worn out, the sound produced by this friction is constant throughout the braking. Conversely, when the pad 81 is worn out, the sound produced by the friction changes when the pad 81 rubs in the area of the transmission zones Z3a1, Z3a2, Z3b1. This difference in sound enables the user to determine, during braking, whether the pad 81 is worn out. Indeed, due to the height difference Δh, the sound produced by the friction of the pads 81 becomes discontinuous if the pads 81 are worn out, and a staccato sound alerts the user that the pads 81 are worn out.

The width L8 of the pad 81 decreases in a more pronounced manner on the side of the pad 81 turned toward the axis of rotation X and in the vicinity of the support 82 than on the side of the friction surface S8. Due to the sharp variation in the width L8 near the support 82, in the zone of maximum wear of the pad 81, the sound signal is emitted quite suddenly, thereby making it easy to detect. This sharp variation in the width L8 occurs on the side of the axis of rotation X because this zone rubs on the portion of the braking surfaces S5a, S5b having the height differences Δh that is useful for the detection of wear. Alternatively, the pad 81 is symmetrical and its width L8 decreases in a more pronounced manner in the vicinity of the support 82, on the side of the pad 82 turned toward the axis of rotation X and on the side of the pad 82 turned toward the tire.

Figure 10:
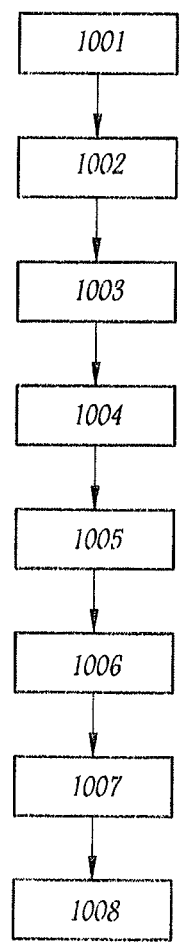
FIG. 10 is a block diagram of a method for manufacturing the rim.
Figure 11:
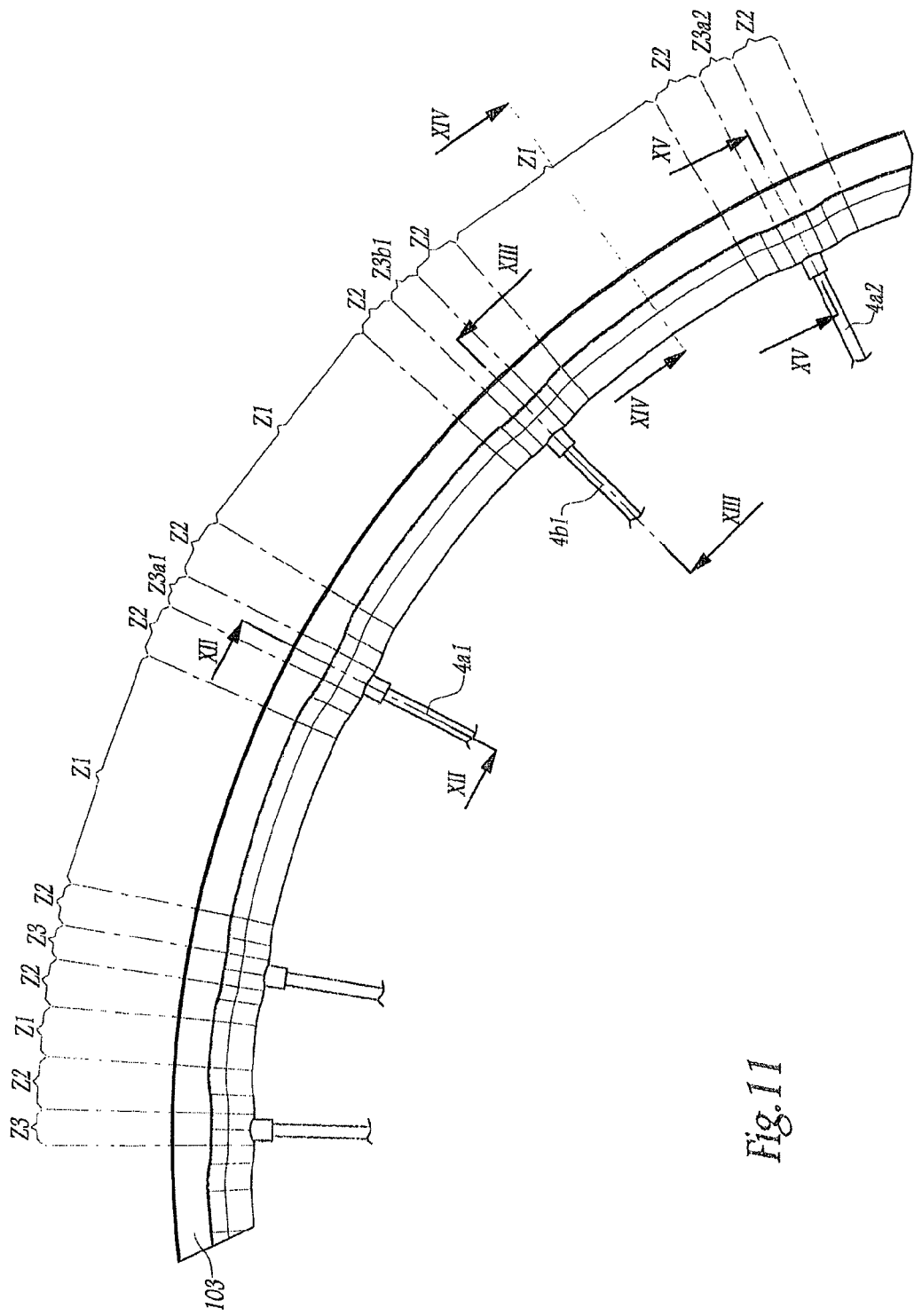
FIG. 11 is a view, similar to FIG. 2, of a rim according to a second embodiment of the invention.
Figure 13:
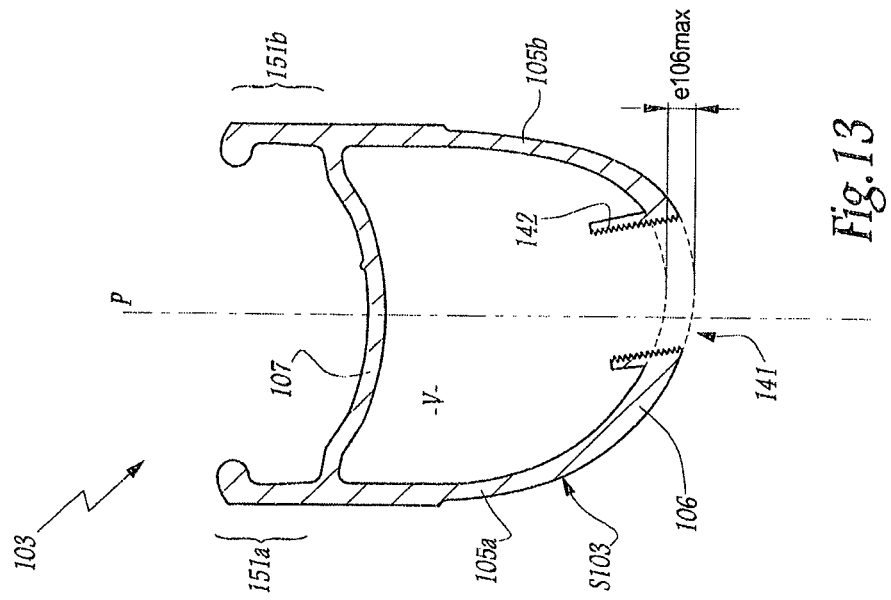
Figure 12:
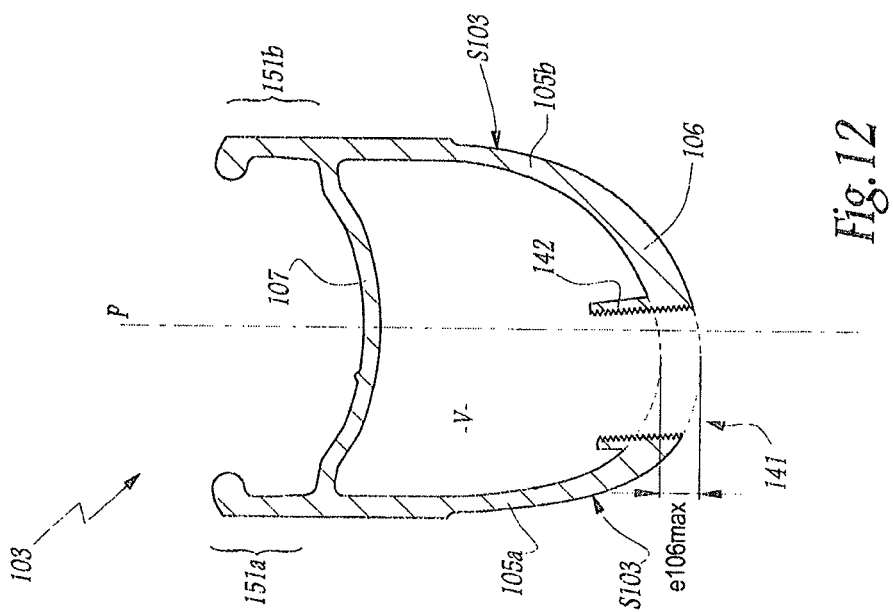

The following description relates to a method for manufacturing the rim 3, shown in FIG. 10, which proceeds successively from 1001 to 1008.

Figure 6:
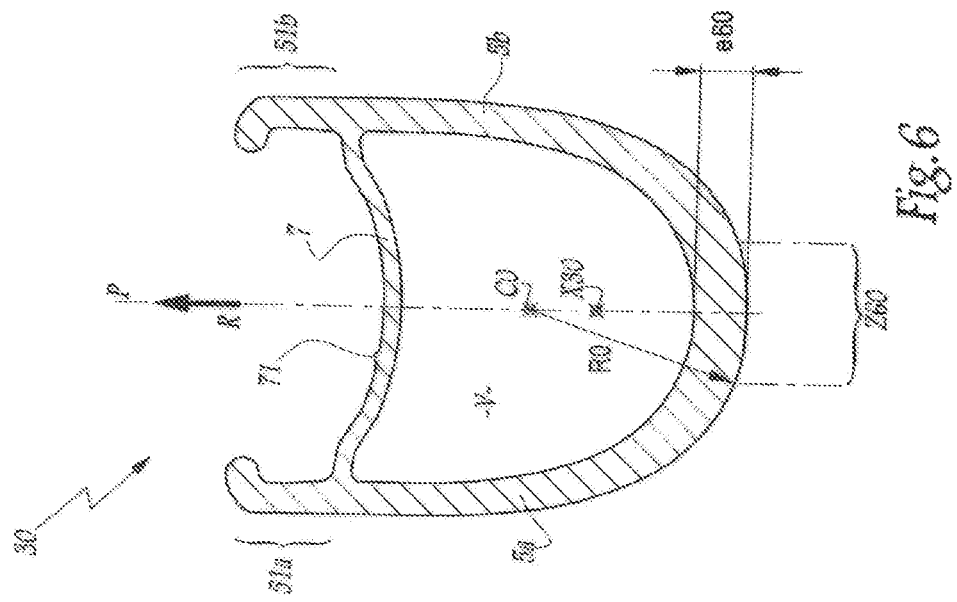
FIG. 6 is a transverse cross section of a section from which the rim is made.

During extrusion 1001, a rectilinear section 30, whose transverse cross section is shown in FIG. 6, is made by extruding or spinning a metal alloy, such as an aluminum alloy, for example. The cross section of the section 30 is similar to that of the rim 3 and comprises two sidewalls 5a, 5b and an arcuate bridge connecting the sidewalls 5a, 5b. A transverse wall 7, generally perpendicular to the sidewalls 5a, 5b, connects the sidewalls 5a, 5b to one another. On the side opposite the bridge, the sidewalls 5a, 5b are each provided with an L-shaped flange 51a, 51b.

The bridge of the section 30 has a thickness e60, shown in FIG. 6, measured along the radial direction R in the median plane P, perpendicular to the longitudinal axis X30 of the section.

The outer surface S60 of the bridge of the section 30 has a center of curvature C0 and a radius of curvature R0, measured over a zone Z60 10 mm wide. The radius R0 is greater than the radius R6 of the rim 3. The radius R0 is greater than 20 mm.

During bending 1002, the portion of the section 30 is bent to form a plurality of circular helical coils, for example by means of a roll bender. For example, three coils are formed from the section 30 which then has a length equivalent to about three times the circumference of the rim 3.

During cutting 1003, the coils are cut to obtain a plurality of rings having the same perimeter as the rim 3.

To avoid the appearance of defects in the material of the section 30 during the extrusion, the walls of the section 30 should be sufficiently thick. In addition, when the walls of the section 30 are too thin, the section 30 may buckle during bending, and undesired bends may form in the area of the bridge during bending. To prevent these conditions, the thickness e60 of the bridge of the section 30 is greater than 1.6 mm or, in a particular embodiment, greater than 1.9 mm.

During assembly 1004, the ends of the ring obtained during the cutting 1003 are butt-joined and affixed to one another, for example by welding. Alternatively, the ends can be connected by sleeving, by inserting an attached element in the inner volume V at respective ones of the ends of the ring.

The thickness e60 of the section 30 is sufficiently great to produce a solid weld. If the thickness e60 is too small, the weld becomes very difficult to achieve and may break.

During drilling 1005, the valve hole 43 is made, for example by means of a drill.

During flow drilling 1006, the holes 41 and bushings 42 for fastening the spokes 4a1, 4a2, 4b1 are made simultaneously by flow drilling, that is to say, by drilling without cutting. To do this, a flow drill bit operating on the outer surface of the bridge, in the direction of the transverse wall 7, is used to create the bushings 42. The initial thickness e60 of the bridge is sufficient for the bushing 42 to have good mechanical strength. Indeed, the quantity of material flowing back is relatively large, which makes it possible to obtain a sufficiently thick bushing. The valve hole 43 forms an angular reference mark for making the holes 41 and the bushings 42, as well as for carrying out the following parts of the method.

The radius R0 is relatively large, which prevents the flow drill bit from slipping on the bridge, especially when a drill bushing is not used to hold it.

During machining 1007, the outer surface S3 of the rim 3 is machined in its entirety over the entire periphery of the rim 3, that is to say, over 360° and over each zone Z1, Z2, Z3a1, Z3a2, and Z3b1. More specifically, in the radial plane P4, the entire outer surface S3, that is to say, the bridge and the sidewalls 5a, 5b, is machined. For example, one can use a concave milling cutter 100, shown in FIG. 17, which has a generally U-shaped profile or cutting surface S100, and which makes it possible to machine the entire outer surface S3 in a single pass, concurrently in the area of the bridge and in the area of the sidewalls 5a, 5b.

During machining 1007, the milling cutter 100 is rotated about its axis X100, as indicated by the arrow F100. The axis X100 is positioned parallel to the axis X of the rim 3, and the surface S100 is brought into contact with the outer surface S3 of the bent section 30. The rim 3 and the milling cutter 100 are moved in relation to one another in a circular movement having an axis X, so that the milling cutter 100 machines the entire circumference of the rim 3. Simultaneously, the rim 3 and the milling cutter 100 are moved in relation to one another in a translational movement carried out along a radial direction of the rim 3, which makes it possible to select the removed material thickness in the area of the bridge and of the sidewalls 5a, 5b, in order to obtain the thicknesses e6min, e6max, and e6int. Alternatively, a convex milling cutter, a round bur, or any other appropriate cutting tool, can be used.

During a complementary machining portion of the method, the braking surfaces S5a and S5b are machined, for example by means of an end mill.

Thus, the only machined surfaces of the rim 3 are the outer surface S3 and the braking surfaces S5a and S5b. The inner surface S7a of the transverse wall 7, which demarcates the volume V, as well as surfaces S'6a, S'5a, S'5b of the bridge and of the sidewalls 5a, 5b which demarcate the volume V, are not machined. Similarly, the outer surface S7b of the transverse wall 7, which is located outside of the volume V and includes the locating member 71, is not machined. In other words, the only surface of the rim 3 which is machined is an "extended" outer surface that includes the outer surface S3 and the braking surfaces S5a and S5b.

In the case in which the ends of the section 30 are welded together, the machining 1007 makes it possible to trim the weld and create a smooth surface finish over the entire circumference of the rim 3. The weld is then no longer visible, thereby improving the aesthetics of the rim 3. It is not necessary to machine the weld seam subsequently, thus reducing the number of manufacturing steps.

When the rim 3 is machined with a concave milling cutter, the curvature of the outer surface S3 is continuous and does not form a ridge. In other words, the trace of the outer surface S3 in a radial plane is a curve whose derivative is continuous. Therefore, the aerodynamics of the wheel are improved.

The machining is relatively simple as it can be carried out with a single-axis milling machine, by rotating the rim 3 about the axis X in relation to the tool and by radially translating the tool, which simultaneously creates the variations in the thickness e6 of the zones Z1, Z2, Z3a1, Z3a2, Z3b1 and the variations in the height h5. This makes it possible to reduce the cycle time to less than 1 minute. Thus, the manufacturing cost of the rim 3 is reduced.

Because flow drilling is performed prior to machining, the trimming of the holes 41 and 43 occurs automatically during the machining 1007. It is not necessary to perform additional trimming for the holes 41 and 43.

In threading 1008, the inner surface of each of the bushings 42 is threaded to form a thread for threaded engagement of the heads 40 of the spokes 4a1, 4a2, 4b1.

During machining, the removed material thickness in the area of the bridge is more or less substantial, depending upon the machined zone Z1, Z2, Z3a1, Z3a2, Z3b1. The transmission zones Z3a1, Z3a2, Z3b1 retain a relatively substantial thickness e6max. Between the spokes, the thickness e6min of the intermediate zones Z1 is finer. The transition zones Z2 have a thickness e6int that varies progressively.

The machined material thickness and the location of the holes 41 may be adjusted according to several parameters, such as the number of spokes of the wheel 1, the weight of the user, the type of brake (shoe or disk brake), the type of practice (track biking, cross biking, mountain biking, etc.), and the type of spokes, for example. Thus, a rim adapted to the desired application can be made from the same section 30 by changing the manufacturing parameters, in particular the machining range.

In a supplemental machining portion 1009 of the method, the braking surfaces S5a and S5b are machined, for example, by turning or with an end mill.

Notable is a ratio A, whose denominator is the thickness e60, and whose numerator is the maximum thickness e6max. The ratio A is less than 90%.

In the embodiment mentioned above, for example, the ratio A is equal to 87.5% (2.1/2.4).

Alternatively, the variation of the thickness e6 between the minimum thickness e6min and the maximum thickness e6max is not progressive, such that the outer surface S3 of the rim 3 has, at least in the area of the bridge, a ridge or break that is generally oriented parallel to the axis X. In this case, in the area of the transition zones Z2, the intermediate thickness e6int has a discontinuous variation along the circumference of the rim 3, between the intermediate zone Z1 and the transmission zone Z3a1, Z3a2, and Z3b1 adjacent the transition zone Z2.

The rim 3 is part of a rear cycle wheel 1, but the invention also applies to front wheels. The invention also applies to rims having varied numbers of spokes and of various types.

Alternatively, during the flow drilling 1006, boring with material removal is used, instead of flow drilling. In such a case, the rim is cut out to form the holes 41. Bushes can then be fixed in the holes 41 for fastening the spokes 4a1, 4a2, 4b to the rim 3. Flow drilling, which consists of drilling without material removal, and drilling with material removal, are considered two alternative methods of drilling.

Figure 17:
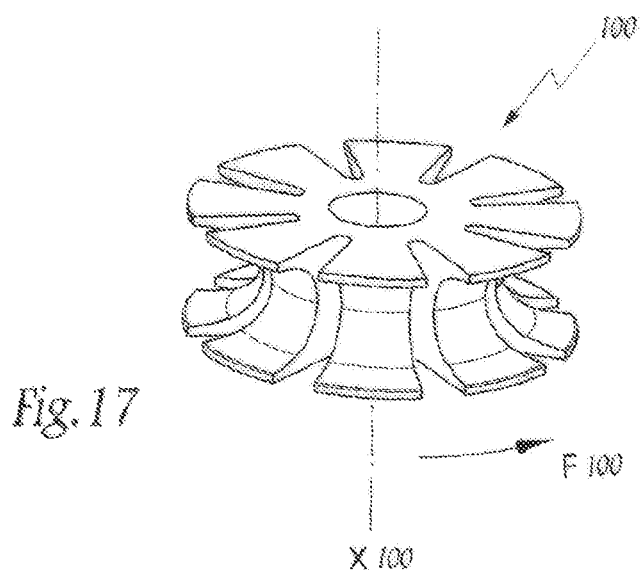
FIG. 17 is a perspective view of a milling cutter used during the manufacture of the rim of FIG. 1.

The milling cutter 100 shown in FIG. 17 has a concave profile with a continuous curvature. In an alternative, however, the concave profile has at least one ridge oriented along a circumferential direction, for example between the bridge and a sidewall 5a or 5b.

FIGS. 11 to 15 show a rim 103 according to a second embodiment of the invention. In the second embodiment, the elements similar to those of the first embodiment are not described in detail. The elements of the rim 103 similar to those of the rim 3 are designated by the same reference numerals increased by 100.

The rim 103 is made from an asymmetrical section to improve the distribution of the forces transmitted between the rim 103 and the spokes 4a1, 4a2, 4b1, which do not extend exactly along the radial direction R and do not all have the same orientation in relation to the plane P.

The rim 103 is made using a method similar to that described above. It is possible to machine the rim 103 from an asymmetrical section, with a milling cutter having a concave profile, whose axis of rotation is inclined in relation to the plane P.

The transverse cross section of the rim 103 has the shape of a hollow box and comprises two sidewalls 105a, 105b and a bridge 106. A transverse wall 107 connects the sidewalls 105a, 105b to one another, opposite the bridge 106. On the side opposite the bridge 106, the sidewalls 105a, 105b are each provided with an L-shaped flange 151a, 151b, provided for fastening a tire, not shown, to the rim 103.

Holes 141 connected to bushings 142 are made in the bridge 106.

Similar to the rim 3, the rim 103 is divided into a plurality of zones Z1, Z2, Z3a1, Z3a2, Z3b1, which divide the circumference of the rim 103 into a plurality of angular sectors. As shown in FIGS. 12 to 15, the thickness e106 of the bridge 106 varies, depending upon the zone Z1, Z2, Z3a1, Z3a2, Z3b1 of the rim 103, in a manner similar to the rim 3 of the first embodiment.

The thickness e106 varies between a maximum thickness e106max, in the area of the transmission zones Z3a1, Z3a2, Z3b1, and a minimum thickness e106min, in the area of the intermediate zones Z1. In the area of the transition zones Z2, the thickness e106 is equal to an intermediate thickness between the minimum thickness e106min and the maximum thickness e106max.

The maximum thickness e106max of the transmission zones Z3a1 of the driving spokes 4a2 is greater than the maximum thickness e106max of the transmission zones Z3a2 of the non-driving spokes 4a1. The thickness e106max of the transmission zones Z3b1 of the spokes 4b1 of the driven spoke set 4b is less than the thickness e106max of the spokes 4a1, 4a2 of the driving spoke set 4a.

Figure 16:
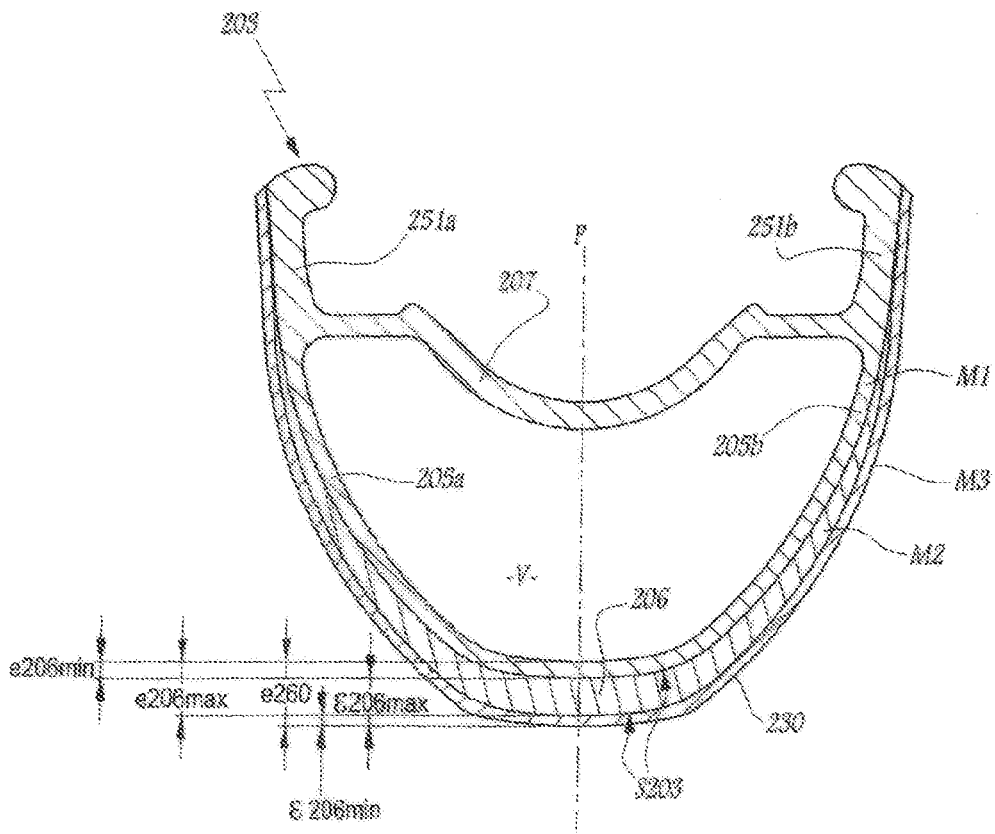
FIG. 16 is a schematic diagram showing two cross sections of a rim according to a third embodiment of the invention, overlaid with a cross section of a section from which this rim is made.

FIG. 16 shows a rim 203 according to a third embodiment of the invention. In the third embodiment, the elements similar to those of the first embodiment are not described in detail. The elements of the rim 203 similar to those of the rim 3 are designated by the same reference numerals increased by 200.

The rim 203 is made using a method similar to that described above and differs from the rims 3 and 103 in that it is part of a disc brake wheel.

The transverse cross section of the rim 203 has the shape of a hollow box and comprises two sidewalls 205a, 205b and a bridge 206. A transverse wall 207 connects the sidewalls 205a, 205b to one another, opposite the bridge 206. On the side opposite the bridge 206, the sidewalls 205a, 205b are each provided with an L-shaped flange 251a, 251b, provided for fastening a tire, not shown, to the rim 203.

The rim 203 has an outer surface S203, which is oriented outward of the rim 203 and is defined by the bridge 206 and by the sidewalls 205a, 205b, up to the free ends of the 251a, 251b. In radial cross section, the outer surface S203 is curved over its entire length. Unlike the rims 3 and 103, the outer surface S203 does not include a planar zone provided to cooperate with a brake pad.

In FIG. 16, a hatched zone M1 corresponds to the transverse cross section of the rim 203, in the area of the intermediate zones Z1 in which the thickness e206 of the bridge 206 is equal to a minimum thickness e206min.

The joining of the hatched zone M1 with a hatched zone M2 corresponds to the transverse cross section of the rim 203, in the area of the transmission zones Z3a1, Z3a2, or Z3a3. The maximum thickness e206max is measured in the area of the transmission zones Z3a1, Z3a2, Z3a3, on the joining of the zones M1 and M2. The hatched zone M2 corresponds to the excess material thickness between the intermediate zones Z1 and the transmission zones Z3a1, Z3a2, or Z3a3 and represents the difference between the minimum thickness e206min and the maximum thickness e206max.

The joining of the hatched zones M1 and M2 with a hatched zone M3 corresponds to the transverse cross section of a section 230 from which the rim 203 is manufactured. Notable is the thickness e260 of the bridge 206 of the section 230. The thickness e260 is greater than the maximum thickness e206max.

The following description provides examples of various thicknesses e206 and e260 of the rim 203 and of the section 230. These thicknesses can also be selected for the rims 3 and 103.

The thickness e260 of the bridge 206 of the non-machined section 230, measured at the end of the extrusion 1001 and prior to the bending 1002, is equal to 2.5 mm.

In an alternative, during the machining 1007, the maximum thickness e206max, measured in the area of the transmission zones Z3a2 in which the driving spokes 4a2 are fastened, is equal to 2.1 mm. These transmission zones Z3a2 are the most mechanically biased in view of the fastening of the driving spokes 4a2. Considering the rim 203 at the end of its manufacture, the thickness e206max in the area of the transmission zones Z3a2 is the greatest thickness e206 of the bridge 206 on the whole; the outer surface 3 or 103 is not machined over the entire circumference of the rim 203.

The maximum thickness e206max, measured in the area of the transmission zones Z3a1 in which the non-driving spokes 4a1 are fastened, is equal to 1.9 mm.

The maximum thickness e206max, measured in the area of the transmission zones Z3b1 in which the spokes 4b1 of the driven spoke set 4b are fastened, is equal to 1.7 mm. The spokes 4b1, located opposite the free wheel mechanism 22 of the hub 2, do not transmit torque and thus are not very biased, which explains the relatively small value of the thickness e206max in the zones Z3b1.

In the area of the intermediate zones Z1, the minimum thickness e206min is equal to 0.65 mm.

In this example, the greatest difference between the thicknesses e206max and e206min, considered in the area of the transmission zones Z3a2 of the driving spokes 4a2, is equal to 1.25 mm.

ϵ206 is the removed material thickness at the bridge 206, at the end of the machining 1007, measured along the radial direction R, in the plane P and perpendicular to the axis X. The thickness ϵ206 is equal to the difference between the thickness e260 of the bridge 206 of the section 230 and the thickness e206 of the bridge 206 of the rim 203. The removed material thickness ϵ206 varies as a function of the zone Z3a1, Z3a2, Z3b1, Z2, or Z1 considered. The maximum removed material thickness ϵ206max is reached in the area of the intermediate zones Z1, in which it is equal to 1.45 mm. The minimum removed material thickness ϵ206min is reached in the area of the transmission zones E3a2 of the driving spokes 4a2, in which it is equal to 0.2 mm.

During the machining 1007, the minimum removed material thickness ϵ206min selected must be sufficiently substantial in order for the machining to eliminate the asperities generated during the extrusion and bending of the section 230. In a particular embodiment, the minimum removed material thickness ϵ206min is greater than 0.1 mm or, in specific case, greater than 0.3 mm.

In addition, during the machining 1007, the depth-of-cut selected should be sufficiently small to ensure complete continuity of the cut and to guarantee a smooth surface finish. In one embodiment, the cutting depth can be less than 0.4 mm; in another embodiment, a cutting depth of less than 0.2 mm can be selected.

FIGS. 18-21 show a rim 303 and a section 330 consistent with a fourth embodiment of the invention and forming part of a disc brake wheel. In the fourth embodiment, the elements similar to those of the first embodiment are not described in detail. The elements of the rim 303 and of the section 330 similar to those of the rim 3 and of the section 30 according to the first embodiment are designated by the same reference numerals increased by 300.

The transverse cross section of the rim 303 has the shape of a hollow box and comprises two lateral sidewalls 305a and 305b and a bridge 306. A transverse wall 307 connects the sidewalls 305a, 305b to one another, opposite the bridge 306. On the side opposite the bridge 306, the sidewalls 305a, 305b are each provided with an L-shaped flange 351a, 351b, provided for fastening a tire, not shown, to the rim 303.

The rim 303 is made using a method that is generally similar to that described above and differs from the rims 3, 103, and 203 in that only the bridge 306 of the rim 303 is machined during the machining 1007. Thus, the lateral sidewalls 305a, 305b are not machined.

The rim 303 has an outer surface S303 oriented outward of the rim 303 and defined by the bridge 303 and by all of the sidewalls 305a, 305b, up to the free end of the-flanges 351a, 351b.

Figure 20:
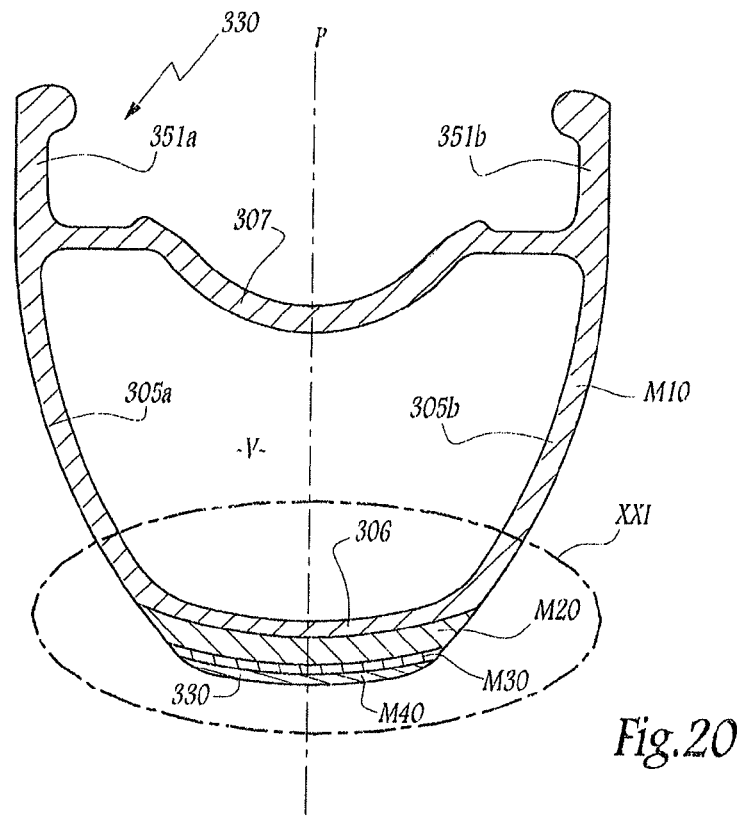
FIG. 20 is a schematic diagram showing three cross sections of the rim of FIG. 19, overlaid with the cross section of the section of FIG. 18.
Figure 21:
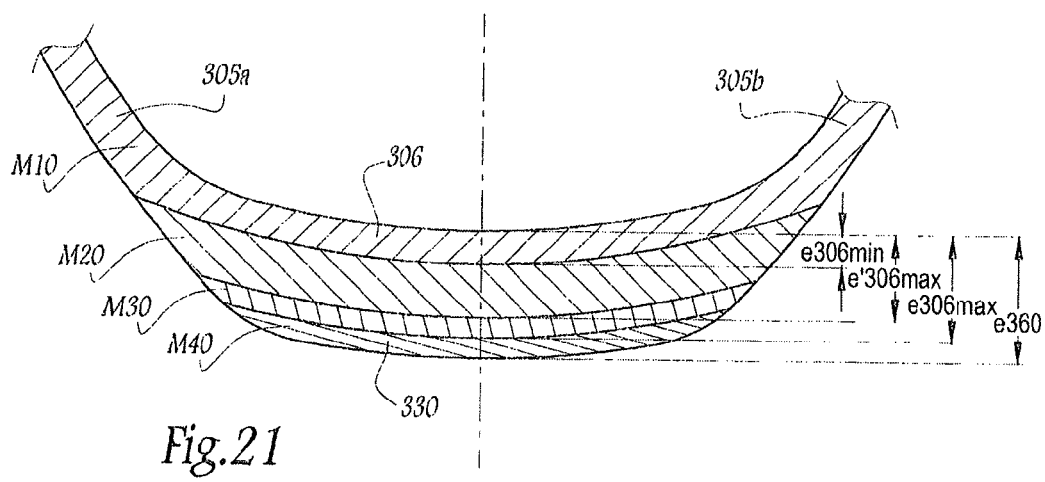
FIG. 21 is a view, on a larger scale, of the detail XXI of FIG. 20.

In FIGS. 20 and 21, a hatched zone M10 corresponds to the transverse cross section of the rim 303, in the area of the intermediate zones Z1, in which the thickness e306 of the bridge 306 is equal to a minimum thickness e306min.

The joining of the hatched zone M10 with a hatched zone M20 corresponds to the transverse cross section of the rim 303, in the area of the transmission zones Z3b1 in which the spokes 4b1 comprised in the driven spoke set 4b are fastened. Notable is a maximum thickness e'306max measured in the area of the transmission zones Z3b1, on the joining of the zones M10 and M20. The hatched zone M20 thus corresponds to the excess material thickness between the intermediate zones Z1 and the transmission zones Z3b1 and represents the difference between the minimum thickness e306min and the maximum thickness e'306max.

The joining of the hatched zones M10 and M20 with a hatched zone M30 corresponds to the transverse cross section of the rim 303, in the area of the transmission zones Z3a1, Z3a2, in which the spokes 4a1, 4a2 comprised in the driving spoke set 4a are fastened. Notable is a maximum thickness e306max measured in the area of the transmission zones Z3a1, Z3a2, on the joining of the zones M10, M20, and M30.

The hatched zone M30 thus corresponds to the excess material thickness between the transmission zones Z3b1 in which the spokes 4b1 of the driven spoke set 4b are fastened and the transmission zones Z3a1, Z3a2 in which the spokes 4a1, 4a2 of the driving spoke set 4a are fastened. The hatched zone M30 thus represents the difference between the maximum thickness e'306max and the maximum thickness e306max.

The joining of the hatched zones M10, M20, M30, with a hatched zone M40 corresponds to the transverse cross section of the section 330 from which the rim 303 is made. Notable is the thickness e360 of the bridge 306 of the section 330. The thickness e360 is greater than the maximum thickness e306max.

The thicknesses e306 and e360 of the rim 303 and of the section 330 may be selected to be equal to the thicknesses e206 and e230 of the rim 203 and of the section 230 according to the third embodiment.

Figure 18:
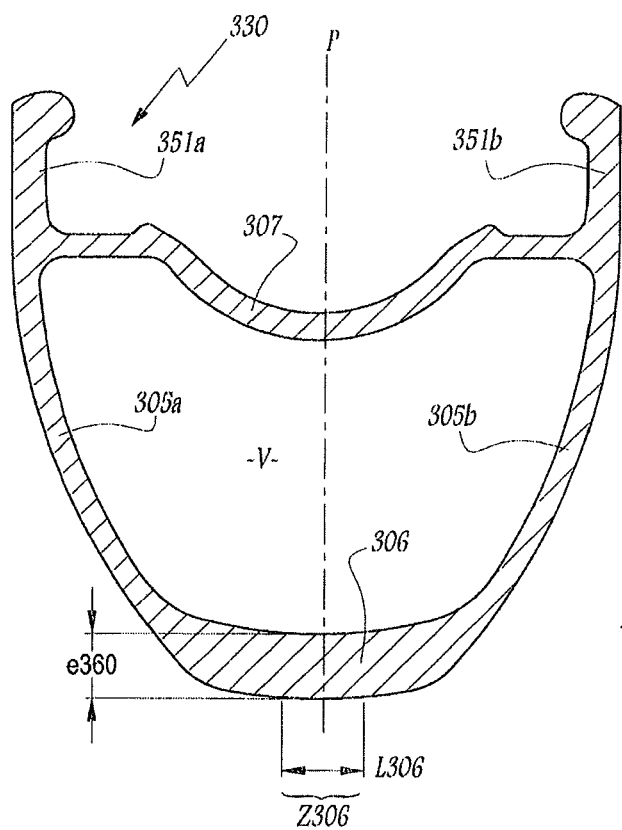
FIG. 18 is a transverse cross section of a section from which a rim is manufactured according to a fourth embodiment of the invention.
Figure 19:
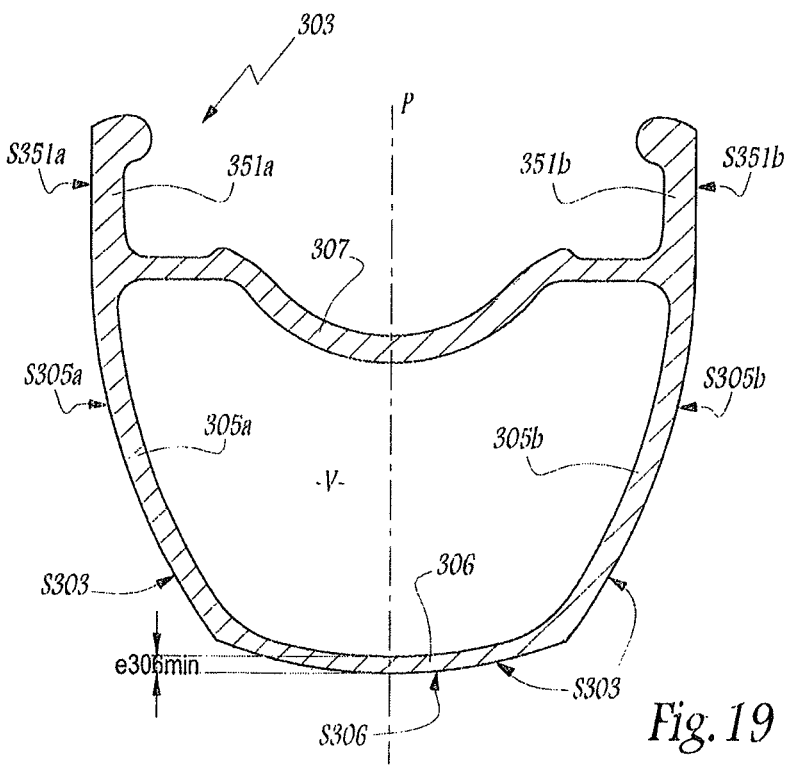
FIG. 19 is a radial cross section of the rim according to the fourth embodiment of the invention.

The following description relates to a fifth embodiment of the invention, in which a rim, not shown, is made from the section 330 of FIG. 18.

The method for manufacturing this rim is generally similar to that for the rim 303. However, in the machining 1007, only a median zone Z306 of the outer surface of the bridge 306 is machined, over the entire circumference of the rim. Thus, the bridge 306 is not machined in its entirety. The median zone Z306 has a transverse width L306, measured perpendicular to the median plane P and greater than or equal to 4 mm. Thus, the bridge 306 is machined in the vicinity of all of the zones of attachment of the spokes 4a1, 4a2, 4b1, in the locations in which the mechanical stresses are the most substantial. Machining the bridge 306 only in the area of the median zone Z6 delays the appearance of cracks that might be initiated when the rim is used and subject to conditions causing fatigue. For example, it is possible to machine the intermediate zones Z1 only, or both the intermediate zones Z1 and the transition zones Z2.

The known prior art methods for manufacturing rims have systematically sought to reduce the thickness of the section to a maximum. Conversely, the invention deliberately provides a thickness e60 of the bridge 6 of the section that is relatively substantial, greater than the maximum thickness e6max of the bridge 6, considered at the end of the manufacture of the rim 3 and over the entire circumference of the rim 3, and subsequently to machine the entire circumference of the rim 3.

In the context of the invention, the various embodiments described above can be combined with one another, at least partially.

At least because the invention is disclosed herein in a manner that enables one to make and use it, by virtue of the disclosure of particular exemplary embodiments of the invention, the invention can be practiced in the absence of any additional element or additional structure that is not specifically disclosed herein.

The invention claimed is:

1. A method for manufacturing a rim for a cycle wheel, the rim having a U-shaped radial cross section, with two lateral sidewalls and a bridge connecting the sidewalls to one another and positioned to be opposite an axis of rotation of the wheel, the rim having an outer surface facing outward of the rim and defined by the bridge and by at least a portion of the sidewalls, the manufacturing method comprising:

extruding a rectilinear section, the section comprising two lateral sidewalls and a bridge connecting the sidewalls to one another and positioned to be opposite an axis of rotation of the wheel, the section having an outer surface facing outward of the rim and defined by the bridge and by at least a portion of the sidewalls;

bending the section to form at least one hoop having two ends;

assembling the ends of the hoop of the section to one another to define a circumference;

drilling holes through the bridge for fastening the spokes of the wheel;

after the drilling, machining at least one median zone of the outer surface of the bridge over at least 95% of the circumference of the rim, the median zone having a transverse width of greater than 4 mm measured perpendicular to a median plane of the rim;

said machining comprising using a milling cutter having a concave profile and enabling the bridge and at least a portion of the sidewalls to be machined simultaneously in a radial plane.

2. A method according to claim 1, wherein:

said machining comprises machining the median zone of the outer surface of the bridge over an entire circumference of the rim.

3. A method according to claim 2, wherein:

said machining comprises, on at least a portion of the circumference of the rim, machining an entirety of the outer surface of the rim in a radial plane.

4. A method according to claim 3, wherein:

the outer surface of the rim includes an entirety of the outer surface of the sidewalls.

5. A method according to claim 1, wherein:

the rim is divided into a plurality of zones dividing the circumference of the rim into angular sectors, the zones comprising:

transmission zones located around the zones of attachment of the spokes of the wheel; and intermediate zones located between the transmission zones;

in an area of the transmission zones, the thickness of the bridge, measured in the median plane of the rim, is equal to a maximum thickness;

in an area of the intermediate zones, the thickness of the bridge, measured in the median plane of the rim at the end of said machining, is equal to a minimum thickness less than the maximum thickness; and during said machining, the outer surface of the rim is machined, at least in the area of the intermediate zones.

6. A method according to claim 5, wherein:

the plurality of zones further includes transition zones each located between a transmission zone and an intermediate zone;

in the area of the transition zones, the thickness of the bridge is equal to an intermediate thickness varying progressively between the minimum thickness and the maximum thickness of the bridge; and during said machining, the outer surface of the rim is machined, at least in the area of the transition zones.

7. A method according to claim 1, wherein:

during said machining, an entirety of the outer surface of the rim is machined over the entirety of the circumference of the rim.

8. A method according to claim 1, wherein:

the outer surface includes all of the sidewalls; and during said machining, the entire outer surface of the rim is machined in a radial plane, on at least a portion of the circumference of the rim.

9. A method according to claim 1, wherein:
at the end of said extruding, a radius of curvature of the bridge of the section, measured in the radial plane of the rim, is greater than 20 mm; and
at the end of said machining, a radius of curvature of the bridge of the rim is less than 15 mm.

10. A method according to claim 1, wherein:
at the end of said extruding, a radius of curvature of the bridge of the section, measured in the radial plane of the rim, is greater than 20 mm; and
at the end of said machining, a radius of curvature of the bridge of the rim is less than 10 mm.

11. A method according to claim 1, wherein:
at the end of said extruding, a thickness of the bridge of the section is greater than 1.6 mm.

12. A method according to claim 1, wherein:
at the end of said extruding, a thickness of the bridge of the section is greater than 1.9 mm.

13. A method according to claim 1, wherein:
a ratio is less than 90%, said ratio comprising:
a denominator being a thickness of the bridge of the section, measured at the end of said extruding; and
a numerator being a thickness of the bridge of the rim, measured at the end of said machining.

14. A method according to claim 1, wherein:
during said drilling, holes and bushings for fastening the spokes are made simultaneously by flow drilling the bridge without cutting.

15. A method according to claim 1, wherein:
a machining minimum thickness, equal to the difference between the thickness of the bridge of the section, measured at the end of said extruding, and a minimum thickness of the bridge of the rim, measured at the end of said machining and considered over an entirety of the circumference of the rim, is greater than 0.1 mm.

16. A method according to claim 1, wherein:
a machining minimum thickness, equal to the difference between the thickness of the bridge of the section, measured at the end of said extruding, and a minimum thickness of the bridge of the rim, measured at the end of said machining and considered over an entirety of the circumference of the rim, is greater than 0.3 mm.

17. A method according to claim 16, wherein:
during said drilling, holes and bushings for fastening the spokes are made simultaneously by flow drilling the bridge without cutting.

18. A method for manufacturing a rim for a cycle wheel, the rim having a U-shaped radial cross section, with two lateral sidewalls and a bridge connecting the sidewalls to one another and positioned to be opposite an axis of rotation of the wheel, the rim having an outer surface facing outward of the rim and defined by the bridge and by at least a portion of the sidewalls, the manufacturing method comprising:
extruding a rectilinear section, the section comprising two lateral sidewalls and a bridge connecting the sidewalls to one another and positioned to be opposite an axis of rotation of the wheel, the section having an outer surface facing outward of the rim and defined by the bridge and by at least a portion of the sidewalls;
bending the section to form at least one hoop having two ends;
assembling the ends of the hoop of the section to one another to define a circumference;
drilling holes through the bridge for fastening the spokes of the wheel;
after the drilling, machining at least one median zone of the outer surface of the bridge over at least 95% of the circumference of the rim, the median zone having a transverse width of greater than 4 mm measured perpendicular to a median plane of the rim;
at the end of said extruding, a radius of curvature of the bridge of the section, measured in the radial plane of the rim, is greater than 20 mm; and
at the end of said machining, a radius of curvature of the bridge of the rim is less than 15 mm.

19. A method for manufacturing a rim for a cycle wheel, the rim having a U-shaped radial cross section, with two lateral sidewalls and a bridge connecting the sidewalls to one another and positioned to be opposite an axis of rotation of the wheel, the rim having an outer surface facing outward of the rim and defined by the bridge and by at least a portion of the sidewalls, the manufacturing method comprising:
extruding a rectilinear section, the section comprising two lateral sidewalls and a bridge connecting the sidewalls to one another and positioned to be opposite an axis of rotation of the wheel, the section having an outer surface facing outward of the rim and defined by the bridge and by at least a portion of the sidewalls;
bending the section to form at least one hoop having two ends;
assembling the ends of the hoop of the section to one another to define a circumference;
drilling holes through the bridge for fastening the spokes of the wheel;
after the drilling, machining at least one median zone of the outer surface of the bridge over at least 95% of the circumference of the rim, the median zone having a transverse width of greater than 4 mm measured perpendicular to a median plane of the rim;
at the end of said extruding, a radius of curvature of the bridge of the section, measured in the radial plane of the rim, is greater than 20 mm; and
at the end of said machining, a radius of curvature of the bridge of the rim is less than 10 mm.

* * * * *